(No Model.)
H. H. BRUNDAGE.
CARRIAGE JACK.
No. 251,677. Patented Dec. 27, 1881.
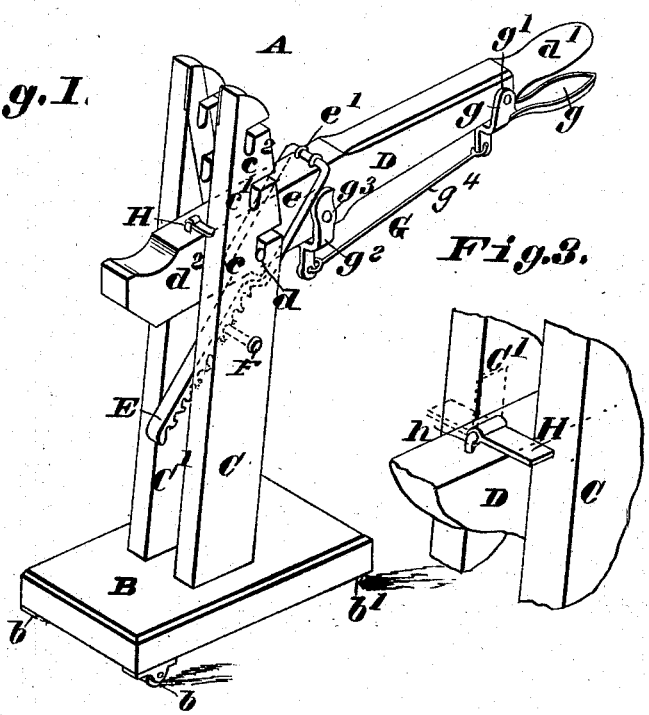
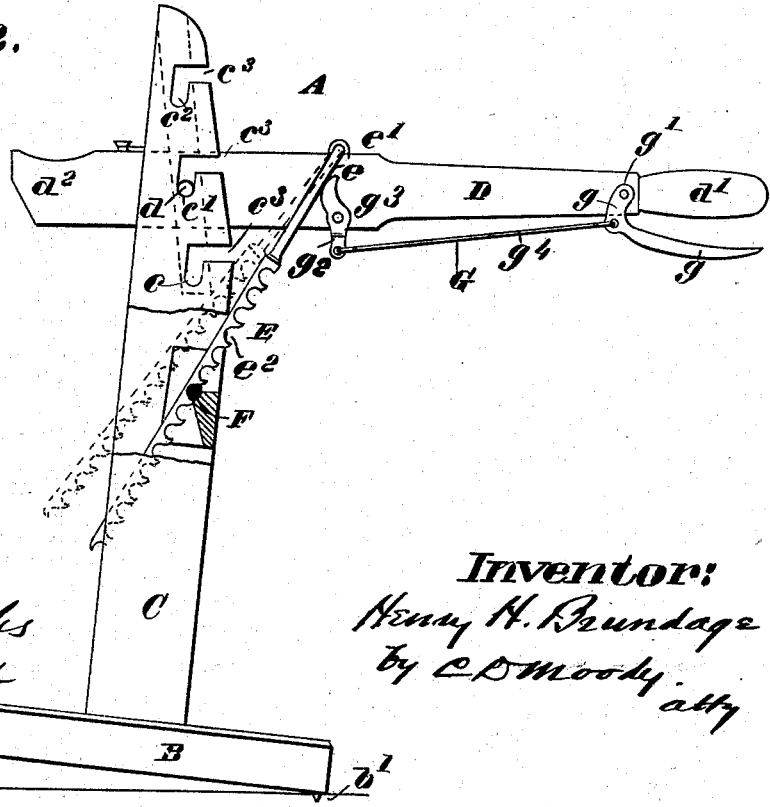
Attest:
Charles Pickles
Saml. S. Boyd
Inventor:
Henry H. Brundage
by C. D. Moody, atty

UNITED STATES PATENT OFFICE.

HENRY H. BRUNDAGE, OF ST. LOUIS, MISSOURI, ASSIGNOR OF ONE-HALF TO GEORGE D. BARNARD, OF SAME PLACE.

CARRIAGE-JACK.

SPECIFICATION forming part of Letters Patent No. 251,677, dated December 27, 1881.

Application filed September 27, 1881. (No model.)

*To all whom it may concern:*

Be it known that I, HENRY H. BRUNDAGE, of St. Louis, Missouri, have made a new and useful Improvement in Carriage-Jacks, of which the following is a full, clear, and exact description, reference being had to the annexed drawings, making part of this specification, in which—

Figure 1 is a view in perspective of the improvement; Fig. 2, a side elevation, a portion of the near upright being broken away; and Fig. 3, a detail.

The same letters denote the same parts.

The present improvement relates more especially to the peculiar means shown for locking the jack-lever in use and for detaching the tie used in locking the jack-lever.

Referring to the drawings, A represents the improved jack having the base B, the uprights C C', and the lever D. The base B at one end is furnished with rollers $b$ and at the other end with points or projection $b'$. By tilting and adjusting the jack, so that it is supported exclusively by the rollers $b$, it can be readily wheeled and moved about from place to place; but by letting the points $b'$ as well as the rollers support it as shown in Figs. 1 and 2, the jack is secured from slipping out of place when supporting the carriage.

The lever D at each side is provided with journals $d$, and the uprights C C' have a series of bearings, $c$ $c'$ $c^2$, to receive the lever-journals, enabling the jack-lever to be supported at various heights. The slots $c^3$ leading to the bearings pass horizontally into the uprights, and then downward, as shown, to the bearings. The latter are out of line vertically with each other, as shown, for the purpose of preventing the strain imposed by the lever in any of the upper bearings from coming directly over any of the slots $c^3$ beneath.

E represents a bar used in locking the lever D in use at the desired angle. The bar at its upper end has an eye, $e$, to receive the lever D, and it is pivoted or hinged to the lever at $e'$. Below the eye $e$ the bar is furnished with a series of hooks, $e^2$ $e^2$, suitable for engaging with a pin, F, that is fixed in the uprights C C', and when thus engaged the bar prevents the handle end $d'$ of the lever D from lifting when the weight is imposed upon the other end, $d^2$, of the lever. The bar E can be readily disengaged from the pin F by means of the device G, which consists of the lever $g$, pivoted to the lever D at $g'$, the forked lever $g^2$, pivoted to the lever D at $g^3$, and the rod $g^4$, which connects the levers $g$ and $g^2$. By clasping the lever $g$ and drawing it toward the handle $d'$ the upper end of the lever $g^2$ is moved against the eye $e$, causing the bar E to turn on the pivot $e'$ and to be disengaged from the pin F. The lever D is then free to be turned in its bearings in the uprights C C', and when in the desired position the lever can at once be fastened by releasing the lever $g$, which allows the bar E to fall and become interlocked with the pin F. The handle of the lever $g$ being beneath the handle $d'$, the lever D and device G can be readily operated either singly or together, and with but a single hand. When the bar E is raised by means of the device G the lever D, together with the bar E, can be withdrawn from any one of the series $c$ $c'$ $c^2$ of bearings and inserted elsewhere in the series, as desired.

It being sometimes desirable to uphold the lever D in a horizontal position when the jack is not in use, the lever D is furnished with a stop, H, which is hinged to the lever at $h$. When the stop is turned down into the position shown in the full lines in Fig. 3 it comes against the upright C, and the lever is upheld; but when the stop is in a vertical position the lever is free to be moved upward and downward in its bearings in the uprights. The stop can be made to work with sufficient friction on the pivot $h$ to render it self-supporting in a vertical position.

I claim—

1. The combination of the lever D, bar E, and device G, said device consisting of the lever $g$, the lever $g^2$, and rod $g^4$, and the handle of the lever $g$ being beneath the handle of the lever D, substantially as described.

2. The combination of the uprights C C', lever D, bar E, pin F, and device G, the lever $g^2$ of said device simply bearing against the bar E, enabling the latter to be worked independently of the device G, and preventing any strain upon the bar from being transmitted to the device, substantially as described.

HENRY H. BRUNDAGE.

Witnesses:
C. D. MOODY,
GEO. D. BARNARD.